(12) United States Patent
Jeon

(10) Patent No.: US 7,936,427 B2
(45) Date of Patent: May 3, 2011

(54) OPTICAL SENSOR FOR DETECTING PERIPHERAL LIGHT AND LIQUID CRYSTAL DISPLAY DEVICE USING THE SAME

(75) Inventor: Mu-kyung Jeon, Suwon (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 359 days.

(21) Appl. No.: 12/142,425

(22) Filed: Jun. 19, 2008

(65) Prior Publication Data

US 2009/0073360 A1    Mar. 19, 2009

(30) Foreign Application Priority Data

Sep. 14, 2007  (KR) .................. 10-2007-0093630

(51) Int. Cl.
*G02F 1/133*    (2006.01)
*H03F 3/08*    (2006.01)
(52) U.S. Cl. ............... 349/116; 250/200; 250/214 AL; 345/76
(58) Field of Classification Search ........... 349/116
See application file for complete search history.

(56) References Cited

U.S. PATENT DOCUMENTS

| | | | | |
|---|---|---|---|---|
| 2005/0258341 A1* | 11/2005 | Nishikawa et al. | ........ | 250/214.1 |
| 2008/0149811 A1 | 6/2008 | Kim | | |
| 2008/0170047 A1* | 7/2008 | Sato | .............. | 345/175 |

FOREIGN PATENT DOCUMENTS

| | | |
|---|---|---|
| EP | 1 617 192 A1 | 1/2006 |
| JP | 2002-023658 | 1/2002 |
| JP | 2005-208582 | 8/2005 |
| JP | 2006-13407 | 1/2006 |
| JP | 2006-029832 | 2/2006 |
| JP | 2006-253236 | 9/2006 |
| JP | 2006253236 A * | 9/2006 |
| JP | 2007-178982 | 7/2007 |
| KR | 2003-0075317 A | 9/2003 |
| KR | 10-2004-0044588 | 5/2004 |
| KR | 10-2007-0017695 | 2/2007 |
| KR | 10-2007-0060469 A | 6/2007 |

OTHER PUBLICATIONS

European Search Report dated Dec. 2, 2008 for corresponding European application No. 08164118.5 indicating relevance of listed references in this IDS.
Patent Abstracts of Japan, Publication No. 2005-208582; Date of Publication: Aug. 4, 2005; in the name of Ryuji Nishikawa et al.
Patent Abstracts of Japan, Publication No. 2006-013407; Date of Publication: Jan. 12, 2006; in the name of Ryuji Nishikawa et al.

(Continued)

*Primary Examiner* — Michelle R Connelly Cushwa
(74) *Attorney, Agent, or Firm* — Christie, Parker & Hale, LLP

(57) ABSTRACT

An optical sensor for detecting peripheral light including: at least two first transistors coupled in parallel between an output line and base power supply for detecting an intensity of peripheral light; and at least two second transistors positioned at a side of the first transistors and between the first transistors and a voltage source.

16 Claims, 3 Drawing Sheets

OTHER PUBLICATIONS

Patent Abstracts of Japan, Publication No. 2006-253236; Date of Publication: Sep. 21, 2006; in the name of Takashi Ogawa et al.

Korean Patent Abstracts, Publication No. 1020040044588 A; Date of Publication: May 31, 2004; in the name of Hyeong Jun Kim et al.

Korean Office action dated May 22, 2009, for priority Korean application 10-2007-0093630, noting listed references in this IDS, as well as KR 10-2003-0075317 and KR 10-2007-0060469, both previously filed in an IDS dated Nov. 1, 2008.

Japanese Office action dated Oct. 26, 2010, for corresponding Japanese Patent Application 2007-316742, noting listed references in this IDS, as well as JP 2002-023658, previously filed in an IDS dated Aug. 19, 2009, 2 pages.

* cited by examiner

OPTICAL SENSOR FOR DETECTING PERIPHERAL LIGHT AND LIQUID CRYSTAL DISPLAY DEVICE USING THE SAME

CROSS-REFERENCE TO RELATED APPLICATION

This application claims priority to and the benefit of Korean Patent Application No. 10-2007-0093630, filed on Sep. 14, 2007, in the Korean Intellectual Property Office, the entire content of which is incorporated herein by reference.

BACKGROUND

1. Field of the Invention

The present invention relates to an optical sensor for detecting peripheral light and a liquid crystal display device using the same, and, in particular, to an optical sensor for detecting peripheral light and a liquid crystal display device using the same capable of stably obtaining output current while minimizing a mounting space.

2. Discussion of Related Art

Various flat panel display devices capable of reducing weight and volume, which are disadvantages of cathode ray tubes, have been developed. These include a liquid crystal display (LCD), a field emission display (FED), a plasma display panel (PDP), an organic light emitting display (OLED), etc.

Liquid crystal display devices have advantages of slimness, lightweight, low power consumption, etc., so that they may overcome the disadvantages of existing cathode ray tubes. Liquid crystal display devices may be mounted in mobile equipment, such as mobile phones, personal digital assistants (PDAs), etc., as well as monitors, televisions, etc., which are middle and large-sized products. Such liquid crystal displays are transparent type display devices and display desired images by controlling the amount of light transmitted through liquid crystal layers by utilizing the refractive index anisotropy of liquid crystal molecules.

In such liquid crystal display devices, a backlight radiates light with constant brightness to each pixel unit. However, even though a large amount of light is not required when a peripheral environment is dark, the power consumption of the backlight remains high due to the supply of light with constant brightness to each pixel unit. The backlight consumes 80% or more of the power consumed for operating the liquid crystal display device.

Therefore, there is a need for a method of effectively controlling the light of a backlight by utilizing an optical sensor for detecting peripheral light, and a method of improving the output characteristics of the optical sensor for detecting peripheral light to be able to effectively detect the peripheral light.

SUMMARY OF THE INVENTION

An aspect of an embodiment of the present invention is directed toward an optical sensor for detecting peripheral light, and a liquid crystal display device utilizing the same, that is capable of stably obtaining output current while minimizing a mounting space.

An embodiment of the present invention provides an optical sensor for detecting peripheral light including: at least two first transistors coupled in parallel between an output line and base power supply for detecting an intensity of peripheral light; and at least two second transistors positioned at a side of the first transistors and between the first transistors and a voltage source.

The voltage source may be set to a higher voltage value than that of the base power supply.

First electrodes and gate electrodes of the first transistors may be coupled to the base power supply and second electrodes of the first transistors may be coupled to the output line.

The first transistors may be adapted to control an amount of current flowing into the output line corresponding to the intensity of peripheral light incident on their gate electrodes.

First electrodes of the second transistors may be coupled to the output line, second electrodes of the second transistors may be coupled to the voltage source, and gate electrodes of the second transistors may be coupled to the base power supply.

Another embodiment of the present invention provides a liquid crystal display device including: a pixel unit including a plurality of liquid crystal cells; at least one optical sensor for detecting peripheral light and outputting a peripheral light signal corresponding to an intensity of the peripheral light; a backlight for supplying light to the pixel unit; and a backlight driver for controlling a brightness of light generated from the backlight in accordance with the peripheral light signal, wherein the optical sensor includes: at least two first transistors positioned at an opening part of a black matrix and coupled in parallel between an output line and base power supply for detecting an intensity of peripheral light; and at least two second transistors positioned at a side of the first transistors and overlapping with the black matrix, and between the first transistors and a voltage source.

Another embodiment of the present invention provides an optical sensor for detecting peripheral light including: a first detection transistor and a second detection transistor, the first and second detection transistors being coupled in parallel between an output line and a base power supply for detecting an intensity of peripheral light; a first compensation transistor coupled between the first detection transistor and a voltage source; and a second compensation transistor coupled between the second detection transistor and the voltage source.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
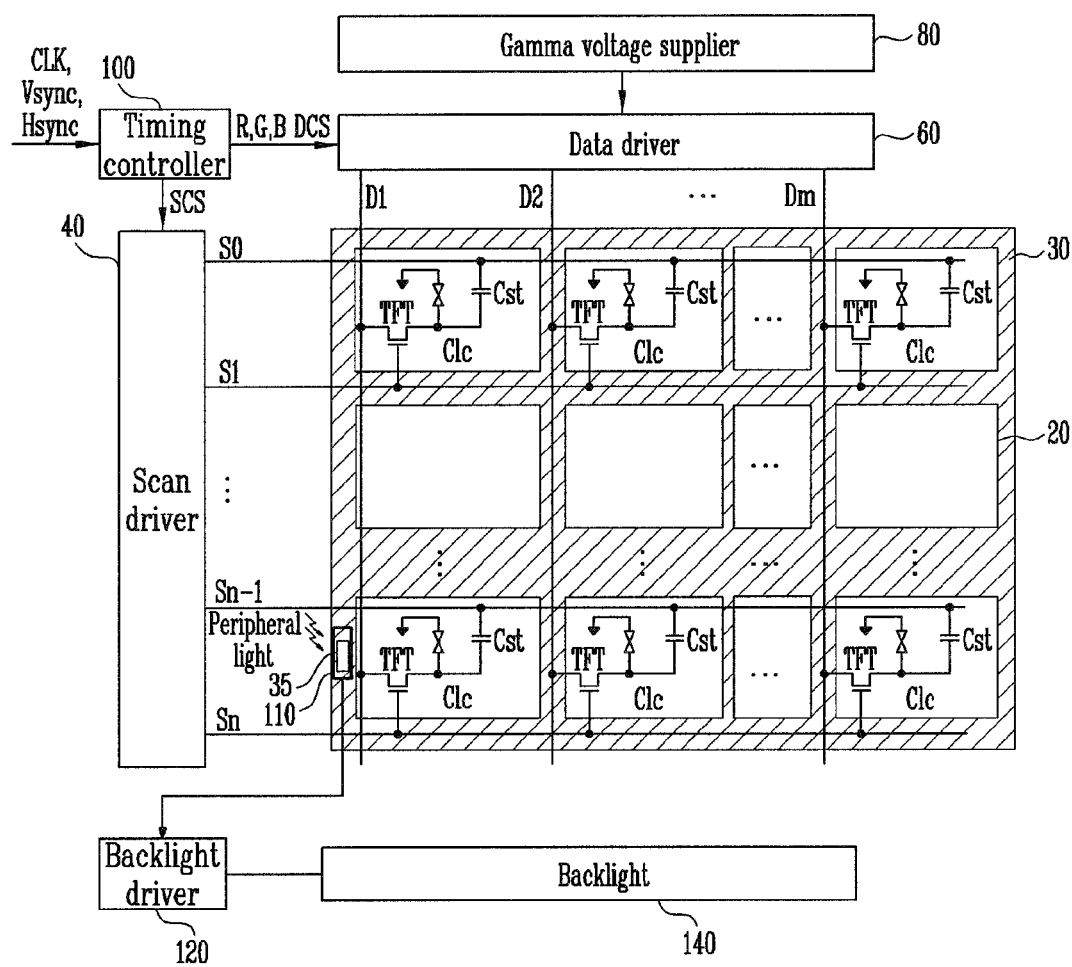
FIG. 1 is a schematic view showing a liquid crystal display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit and scope of the present invention. Accordingly, the drawings and descriptions are to be regarded as illustrative in nature and not restrictive. Like reference numerals designate like elements throughout the specification.

FIG. 1 is a schematic view showing a liquid crystal display device according to an embodiment of the present invention. FIG. 1 shows an active matrix liquid crystal display device, but the present invention is not limited thereto.

Referring to FIG. 1, the liquid crystal display device according to the embodiment of the present invention includes a pixel unit (or display region) 20, a scan driver 40, a data driver 60, a gamma voltage supplier 80, a timing controller 100, an optical sensor 110 for detecting peripheral light, a backlight driver 120, and a backlight 140.

The pixel unit 20 includes a plurality of liquid crystal cells Clc arranged in a matrix type at crossing regions of data lines D1 to Dm and scan lines S1 to Sn. In addition, at least one TFT and at least one storage capacitor Cst are formed in each liquid crystal cell Clc. The TFT supplies data signals supplied from the data line D to the liquid crystal cells Clc corresponding to scan signals supplied from the scan line S. The storage capacitor Cst is formed between a pixel electrode of the liquid crystal cell Clc and a pre-scan line (or a previous scan line) S or between the pixel electrode of the liquid crystal cell Clc and a common electrode line so that it can constantly maintain the voltage of the liquid crystal cell Clc during one frame. As a result, the arrangement angles of liquid crystals in the liquid crystal cells Clc are changed corresponding to the data signals when the scan signals are supplied to the scan line S, and light transmittance is changed according to the arrangement angles, thereby displaying images. A black matrix 30 is formed between the respective liquid crystal cells Clc and at an outer part of the pixel unit 20 so that light incident from neighboring cells or the outer part of the pixel unit 20 is absorbed, thereby preventing (or reducing) the degradation of contrast.

The scan driver 40 sequentially supplies the scan signals to the scan lines S1 to Sn corresponding to a scan control signal SCS supplied from the timing controller 100 to select a line of (or a horizontal line of) the pixel units 20 supplied with the data signals.

The data driver 60 converts digital video data R, G, and B into analog gamma voltages corresponding to gray level values, that is, the data signals, utilizing a scan control signal DCS supplied from the timing controller 100. The data signals converted in the data driver 60 are supplied to the data lines D1 to Dm.

The gamma voltage supplier 80 supplies a plurality of gamma voltages to the data driver 60.

The timing controller 100 generates the scan control signal SCS and the data control signal DCS for controlling the scan driver 40 and the data driver 60, respectively, using vertical and horizontal synchronization signals Vsync and Hsync and an externally supplied clock signal CLK. The scan control signal SCS for controlling the scan driver 40 has a gate start pulse, a gate shift clock, a gate output enable signal, etc. The data control signal DCS for controlling the data driver 60 has a source start pulse, a source shift clock, a source output enable signal, a polarity signals, etc. Also, the timing controller 100 processes the externally supplied data R, G, and B and supplies them to the data driver 60.

The optical sensor 110 for detecting peripheral light is formed at an edge portion of the pixel unit 20, that is, at a region of the black matrix 30. The optical sensor 110 generates the peripheral light signal corresponding to the intensity of peripheral light and then supplies the peripheral light signal to the backlight driver 120. The optical sensor 110 is positioned at a region of an opening part 35 of the black matrix 30.

The backlight driver 120 supplies driving voltage (or driving current) to the backlight 140 to drive the backlight 140. The backlight driver 120 changes the value of the driving voltage (or driving current) corresponding to the peripheral light signal to control the brightness of light generated from the backlight 140. For example, in the case where the backlight driver 120 receives the peripheral light signal from the optical sensor 110 corresponding to a weak intensity peripheral light, the driving voltage (or driving current) of the backlight 140 is lowered by a value (e.g., a predetermined value) corresponding to the intensity of peripheral light so that the brightness of light generated from the backlight 140 is reduced, thereby reducing power consumption. However, in the case where the backlight driver 120 receives the peripheral light signal from the optical sensor 110 corresponding to an intensity of peripheral light above a set (or predetermined) intensity, the driving voltage (or driving current) of the backlight 140 is not changed so that the brightness of light generated from the backlight 140 is not reduced, thereby preventing (or reducing) a degradation in a visual perception characteristic of the pixel unit 20.

FIG. 1 shows only one optical sensor 110 for detecting peripheral light, but the present invention is not limited thereto. For example, a plurality of optical sensors for detecting peripheral light 110 may be included in the region of the black matrix 30. In other words, the number of the optical sensors 110 for detecting peripheral light may be suitably established.

The backlight 140 generates light corresponding to the driving voltage (or driving current) supplied from the backlight driver 120, and then supplies it to the pixel unit 20.

In the liquid crystal display device according to an embodiment of the present invention as described above, there is the optical sensor 110 for detecting peripheral light to detect the intensity of peripheral light, making it possible to control the brightness of light generated from the backlight 140 corresponding to the peripheral light. As a result, power consumption may be reduced.

Further, when the intensity of peripheral light above a set (or predetermined) value is detected, the brightness of light generated from the backlight 140 is not reduced so that degradation in a visual characteristic can be reduced or prevented.

Figure 2:
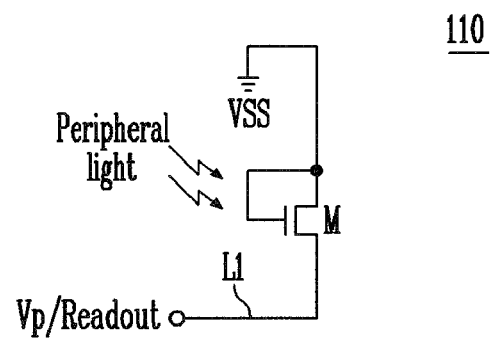
FIG. 2 is a schematic view showing an embodiment of an optical sensor for detecting peripheral light, as shown in FIG. 1.

FIG. 2 is a schematic view showing an embodiment of an optical sensor for detecting peripheral light, as shown in FIG. 1.

Referring to FIG. 2, the optical sensor 110 for detecting peripheral light includes a transistor M coupled between an output line L1 for outputting the peripheral light signal and a base power supply VSS.

More specifically, the first electrode of the transistor M is coupled to the base power supply VSS, which is set, e.g., to ground (GND) voltage, and the second electrode at the transistor M is coupled to the output line L1 of the optical sensor 110 for detecting peripheral light. The first electrode and the second electrode are different electrodes from each other. For example, in the case where the first electrode is a source electrode, the second electrode is a drain electrode. The output line L1 is utilized for detecting the size of current flowing into the optical sensor 110 for detecting peripheral light, as well as receives a pulse wave signal VP. For example, the output line L1 receives the pulse wave signal VP swing between a first voltage that is a ground voltage and a second voltage (for example, a voltage of 2V) with a voltage value higher than the ground voltage and at substantially the same time, is for detecting the size of current flowing into the transistor M.

In addition, a gate electrode of the transistor M is coupled to its first electrode and the base power supply VSS. That is, the gate electrode of the transistor M is coupled to the first electrode for receiving a voltage value lower than that of its second electrode so that it is coupled in a reverse diode-connection form. The gate electrode of the transistor M is positioned at the opening part 35 of the black matrix 30 to receive peripheral light.

When the peripheral light is incident on the gate electrode of the transistor M and the pulse wave signal VP is supplied to the second electrode thereof, current (e.g., predetermined current) flows into the transistor M. Herein, the current flowing into the transistor M is changed in accordance with the intensity of peripheral light. That is, current corresponding to the intensity of peripheral light flows from the second electrode to the first electrode of the transistor M.

The current flowing into the output line L1 of the optical sensor 110 for detecting peripheral light is measured, making it possible to detect the intensity of peripheral light. That is, the current flowing into the output line L1 of the optical sensor 110 for detecting peripheral light is set to the peripheral light signal. Since the transistor M of the optical sensor 110 for detecting peripheral light is coupled in the reverse diode-connection form, the current value corresponding to the intensity of peripheral light is changed in a substantially linear form to assure its reliability.

However, when the optical sensor 110 for detecting peripheral light is implemented with only one transistor M as above, the current output to the output line L1 may be weak, so that the peripheral light cannot be effectively detected.

Accordingly, an embodiment of the present invention proposes an optical sensor 110' for detecting peripheral light capable of generating sufficient output current without having a separate amplification circuit.

Figure 3:
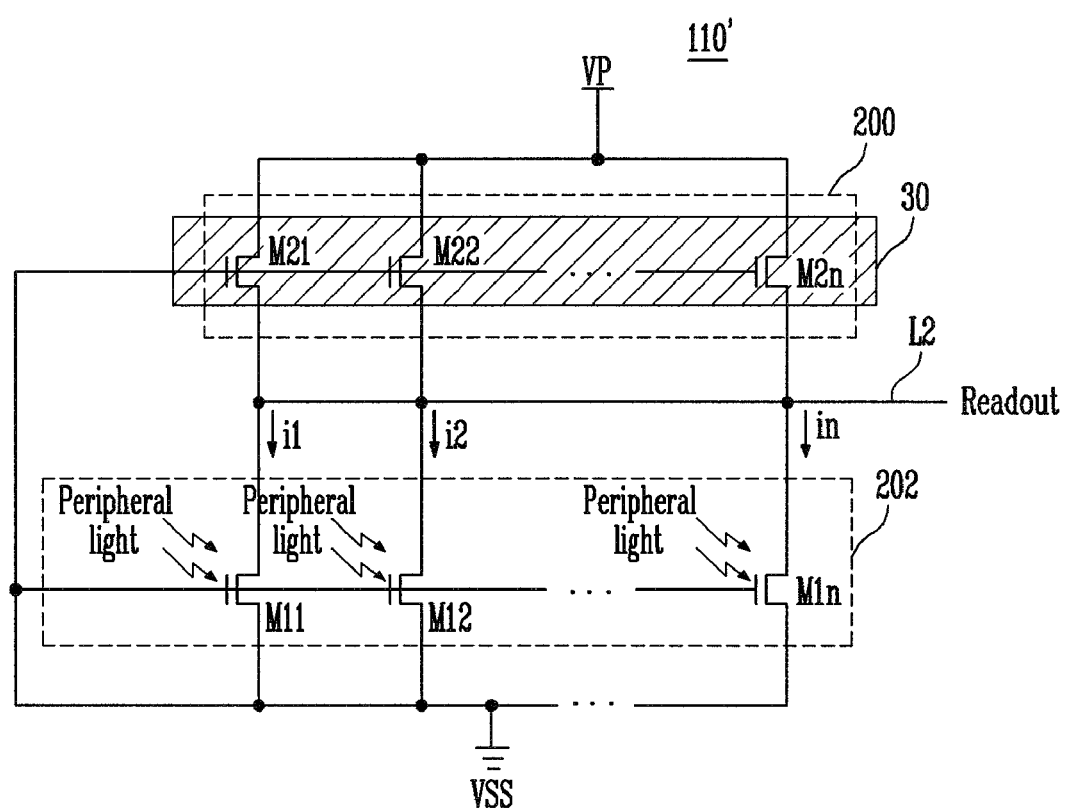
FIG. 3 is a schematic view showing another embodiment of the optical sensor for detecting peripheral light, as shown in FIG. 1.

FIG. 3 is a schematic view showing another embodiment of the optical sensor for detecting peripheral light, as shown in FIG. 1.

Referring to FIG. 3, the optical sensor 110' for detecting peripheral light according to another embodiment of the present invention is divided into a compensator 200 and a sensor 202.

The sensor 202 includes two or more first transistors M11 to M1n coupled in parallel between an output line L2 for outputting the peripheral light signal and the base power supply VSS.

The first electrodes of the first transistors M11 to M1n are coupled to the base power supply VSS and the second electrodes thereof are coupled to the output line L2 of the optical sensor 110' for detecting peripheral light. Also, the gate electrodes of the first transistors M11 to M1n are coupled to their first electrode and the base power supply VSS. That is, the first transistors M11 to M1n are coupled in parallel and the respective first transistors M11 to M1N are coupled in a reverse diode-connection form.

The gate electrodes of the first transistors M11 to M1n are positioned at the opening part 35 of the black matrix 30 so that they can receive the peripheral light. When the peripheral light is incident on the gate electrodes of the first transistors Ml1 to M1n, current corresponding to the intensity of peripheral light flows from the second electrode to the first electrode (reverse current). Here, current, which is the sum of currents (i1 to in) flowing into each of the first transistors M11 to M1n, flows into the output line L2.

The current flowing into the output line L2 is the sum of current flowing into the first transistors M11 to M1n. Therefore, the peripheral light can be stably detected using the current flowing into the output line L2 of the optical sensor 110' for detecting peripheral light without having a separate amplification circuit. Also, in an embodiment of the present invention, since the first transistors M11 to M1n are concurrently (or simultaneously) formed with the TFT, a manufacturing process and a design are simplified.

If the output characteristics are enhanced by coupling the plurality of transistors M11 to M1n in parallel as in an embodiment of the present invention, the size of a light entrance part can be reduced, as compared to the optical sensor for detecting peripheral light having the single large transistor M for obtaining the same output characteristics. Further, the light entrance part on which light is incident can be dispersed, making it possible to reduce the likelihood of or prevent the optical sensor 110' for detecting peripheral light from being recognized by a human eye.

The compensator 200 includes second transistors M21 to M2n coupled between each of the first transistors M11 to M1n and the second voltage source VP (power supply higher than the VSS). The first electrodes of the second transistors M21 to M2n are coupled to the output line L2 and the second electrodes of the second transistors M21 to M2n are coupled to the second voltage source VP. The gate electrodes of the second transistors M21 to M2n are coupled to the base power supply VSS.

The second transistors M21 to M2n are utilized to compensate for the process deviations of the first transistors M11 to M1n. That is, the currents flowing to the first transistors M11 to M1N corresponding to the peripheral light for each region of the liquid crystal display device are different due to the process deviations. The second transistors M21 to M2n are positioned between each of the first transistors M11 to M1n and the second voltage source VP so that the currents flowing into the output line L2 corresponding to the peripheral light are controlled to be the same (or substantially the same) for each region, regardless of process deviations of the first transistors M11 and M1n.

Figure 4A:
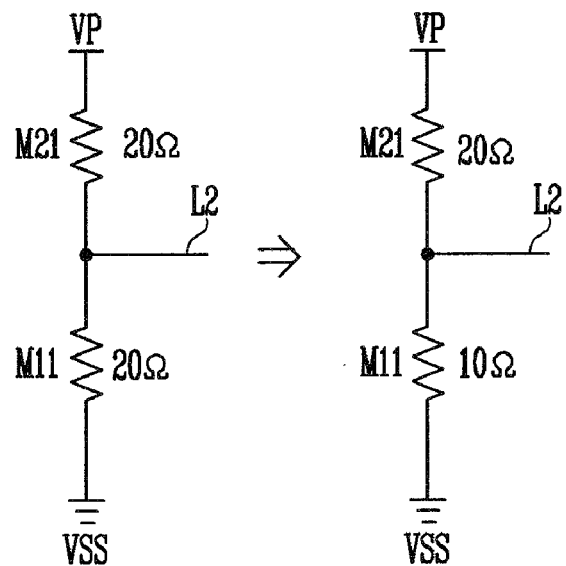
FIGS. 4A and 4B are schematic views showing a compensation concept of the characteristic deviations of transistors in accordance with embodiments of the present invention, as shown in FIG. 3.

In addition, the resistance of the first and second transistors M11 and M21 in a first liquid crystal display device may be 20Ω, as shown in FIG. 4A. (It is assumed that since the first and second transistors M11 and M21 are formed utilizing the same process (or substantially the same process), they have substantially similar characteristics). Thereafter, if the resistance of the first transistor M11 is reduced to 10Ω by peripheral light, current corresponding to the resistance ratio of 20Ω to 10Ω flows into the output line L2.

Figure 4B:
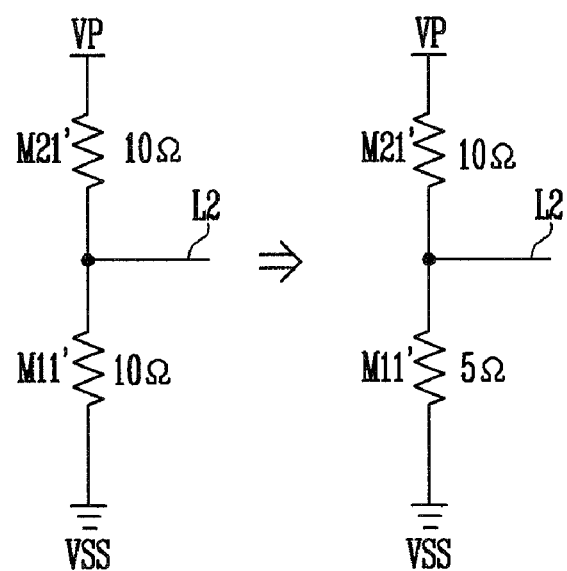

Alternatively, the resistance of the first and second transistors M11' and M21' in a second liquid crystal display device may have 10Ω, as shown in FIG. 4B. Thereafter, if the resistance of the first transistor M11' is reduced to 5Ω by peripheral light, the current corresponding to the resistance ratio of 10Ω to 5Ω flows into the output line L2.

That is, the current flowing into the output line L2 corresponding to peripheral light in the first liquid crystal panel and the second liquid crystal panel can be substantially similar, regardless of the deviations of the transistors M11 and M21.

In another embodiment of the present invention, the second transistors M21 to M2n overlap with the black matrix 30 to have substantially constant characteristics, regardless of the peripheral light. When the second transistors M21 to M2n are positioned to overlap with the black matrix 30, there is an advantage in that the second transistors M21 to M2n are not externally visible.

Also, the second transistors M21 to M2n of an embodiment of the present invention are mounted on the upper and/or lower sides of the first transistors M11 to M1n.

If the second transistors M21 to M2n are on the upper and/or lower sides of the first transistors M11 to M1n, the mounting area can be reduced or minimized. As a result, space utilization can be increased.

In an embodiment of the present invention, all the transistors M are an N-type in FIG. 3, but the present invention is not limited thereto. For example, the transistors M can be a P-type.

In an embodiment of the present invention, since the first transistors utilized as the optical sensor for detecting peripheral light are disposed (or connected or coupled) in parallel, the optical sensor for detecting peripheral light can supply sufficient current without having a separate amplification circuit. Further, since the second transistors for compensating the characteristic deviations of the first transistors are on the upper and/or lower sides of the first transistors, space utilization can be increased or maximized.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An optical sensor for detecting peripheral light comprising:
   at least two first transistors coupled in parallel between an output line and base power supply for detecting an intensity of peripheral light; and
   at least two second transistors positioned at a side of the first transistors and between the first transistors and a voltage source,
   wherein first electrodes and gate electrodes of the first transistors are commonly coupled to the base power supply.

2. The optical sensor for detecting peripheral light as claimed in claim 1, wherein the voltage source is set to a higher voltage value than that of the base power supply.

3. The optical sensor for detecting peripheral light as claimed in claim 1, wherein second electrodes of the first transistors are coupled to the output line.

4. The optical sensor for detecting peripheral light as claimed in claim 3, wherein the first transistors are adapted to control an amount of current flowing into the output line corresponding to the intensity of peripheral light incident on their gate electrodes.

5. The optical sensor for detecting peripheral light as claimed in claim 1, wherein first electrodes of the second transistors are coupled to the output line, second electrodes of the second transistors are coupled to the voltage source, and gate electrodes of the second transistors are coupled to the base power supply.

6. A liquid crystal display device comprising:
   a pixel unit comprising a plurality of liquid crystal cells;
   at least one optical sensor for detecting peripheral light and outputting a peripheral light signal corresponding to an intensity of the peripheral light;
   a backlight for supplying light to the pixel unit; and
   a backlight driver for controlling a brightness of light generated from the backlight in accordance with the peripheral light signal,
   wherein the optical sensor comprises:
   at least two first transistors positioned at an opening part of a black matrix and coupled in parallel between an output line and base power supply for detecting an intensity of peripheral light; and
   at least two second transistors positioned at a side of the first transistors and overlapping with the black matrix, and between the first transistors and a voltage source, and
   wherein first electrodes and gate electrodes of the first transistors are commonly coupled to the base power supply.

7. The liquid crystal display device as claimed in claim 6, wherein the voltage source is set to a higher voltage value than that of the base power supply.

8. The liquid crystal display device as claimed in claim 6, wherein second electrodes of the first transistors are coupled to the output line.

9. The liquid crystal display device as claimed in claim 8, wherein the first transistors are adapted to control an amount of current flowing into the output line in accordance with the intensity of peripheral light incident on their gate electrodes.

10. The liquid crystal display device as claimed in claim 6, wherein first electrodes of the second transistors are coupled to the output line, second electrodes of the second transistors are coupled to the voltage source, and gate electrodes of the second transistors are coupled to the base power supply.

11. An optical sensor for detecting peripheral light comprising:
   a first detection transistor and a second detection transistor, the first and second detection transistors being coupled in parallel between an output line and a base power supply for detecting an intensity of peripheral light;
   a first compensation transistor coupled between the first detection transistor and a voltage source; and
   a second compensation transistor coupled between the second detection transistor and the voltage source,
   wherein first electrodes and gate electrodes of the first and second detection transistors are commonly coupled to the base power supply.

12. The optical sensor for detecting peripheral light as claimed in claim 11, wherein the voltage source is set to a higher voltage value than that of the base power supply.

13. The optical sensor for detecting peripheral light as claimed in claim 12, wherein the base power supply is a ground.

14. The optical sensor for detecting peripheral light as claimed in claim 11, wherein second electrodes of the first and second detection transistors are coupled to the output line.

15. The optical sensor for detecting peripheral light as claimed in claim 14, wherein the first and second detection transistors are adapted to control an amount of current flowing into the output line in accordance with the intensity of peripheral light incident on their gate electrodes.

16. The optical sensor for detecting peripheral light as claimed in claim 11, wherein first electrodes of the first and second compensation transistors are coupled to the output line, second electrodes of the first and second compensation transistors are coupled to the voltage source, and gate electrodes of the first and second compensation transistors are coupled to the base power supply.

* * * * *